United States Patent [19]
Holt

[11] Patent Number: 5,281,049
[45] Date of Patent: Jan. 25, 1994

[54] AIR DIRECTION CONTROL MEANS FOR VEHICLE CLIMATE CONTROL MEANS

[75] Inventor: Donald E. Holt, Woodburn, Oreg.

[73] Assignee: Sprague Aristo-Aire, Inc., Wilsonville, Oreg.

[21] Appl. No.: 868,471

[22] Filed: Apr. 14, 1992

[51] Int. Cl.[5] .............................................. B60H 1/00
[52] U.S. Cl. ...................................... 454/69; 74/105; 74/436; 74/483 R; 137/863; 251/279; 251/294; 454/121
[58] Field of Search ...................... 74/483 R, 105, 436; 251/294, 279; 137/863; 454/69, 121, 126, 139, 156, 159, 160. 161; 165/42, 43

[56] References Cited

U.S. PATENT DOCUMENTS

| | | | |
|---|---|---|---|
| 3,361,005 | 1/1968 | Carpenter | 74/436 |
| 4,271,847 | 6/1981 | Tatemoto | 165/43 X |
| 4,427,056 | 2/1984 | Johnson | 165/42 |

FOREIGN PATENT DOCUMENTS

| | | | |
|---|---|---|---|
| 2304041 | 8/1974 | Fed. Rep. of Germany | 74/483 |
| 2820531 | 11/1979 | Fed. Rep. of Germany | 251/279 |
| 583866 | 10/1958 | Italy | 74/436 |
| 53511 | 3/1983 | Japan | 454/69 |
| 2146826 | 4/1985 | United Kingdom | 454/69 |

OTHER PUBLICATIONS

Kinematics and Dynamics of Machines by Martin—2nd Edition McGraw Hill, p. 63.

*Primary Examiner*—Harold Joyce
*Attorney, Agent, or Firm*—Eugene M. Eckelman

[57] ABSTRACT

A rotatable driver comprising a Geneva type wheel is operated by a turning knob associated with climate designations on a mounting dashboard panel. The driver has drive pins that engage slots in tangential movement in driven links connected to push-pull cables. These cables in turn are connected to control doors in air ducts in vehicle climate control systems. The driver includes a wall segment selectively engageable with the driven links to serve as a stop such that upon driving movement of one of the driven links the other driven link is held stationary. One of the driven links has a cam edge that actuates an electric switch for an air conditioning unit on the vehicle in selected positions of the driven link. A directional air flow lever has an axis of rotation in alignment with the axis of rotation of the rotatable driver and operative between the turning knob and the mounting panel.

12 Claims, 4 Drawing Sheets

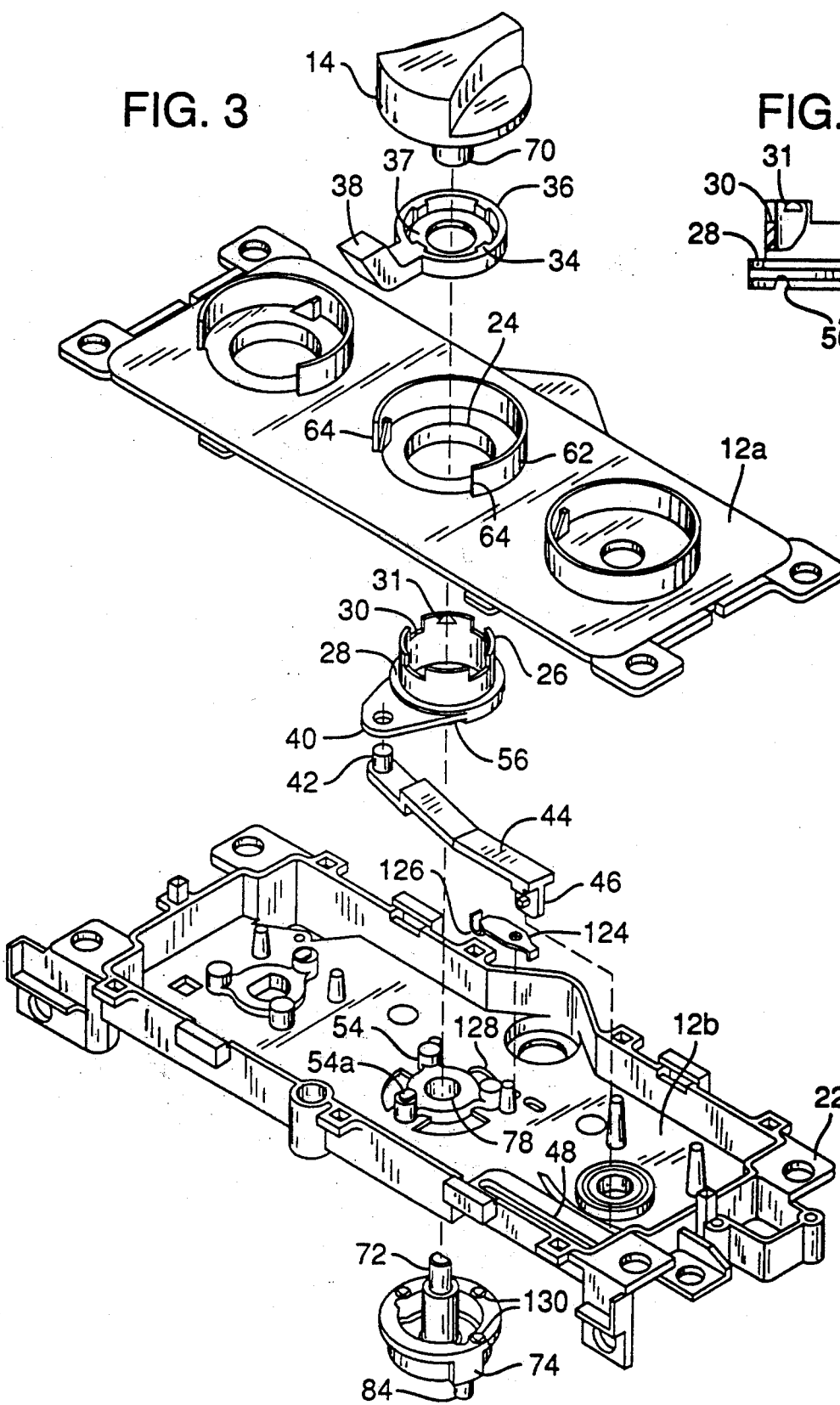
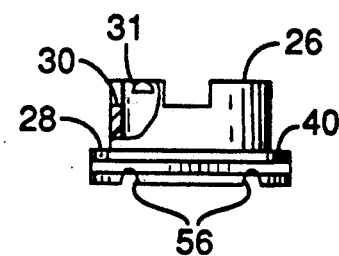
FIG. 3
FIG. 3A

AIR DIRECTION CONTROL MEANS FOR VEHICLE CLIMATE CONTROL MEANS

BACKGROUND OF THE INVENTION

This invention relates to new and useful improvements in climate control means for vehicles, and is more particularly concerned with control means for adjusting air flow in a driver's compartment.

Trucks and passenger cars, as well as other vehicles, are equipped with climate control means for directing air specifically to the operator's compartment. A choice of outside or recirculated air is often present. The climate control means include ducts that have an air inlet, outlets for the air in the driver's compartment comprising an outlet directed toward the floor, a defrost outlet directed toward the inner surface of the windshield, and outlets for intermediate vents. Heater means are incorporated in the ducts and many systems also incorporate air conditioning means. The ducts are associated with a plurality of doors for selectively directing the moving air as commanded by a climate control panel usually provided on the dashboard. These doors, upon being moved to suitable open and closed positions, or intermediate positions, provide for outside or recirculated air, vent flow, a combination vent and floor flow, a combination floor and defrost flow, and defrost flow.

The area behind the dashboard is usually very limited and thus drive means for the climate control means must adapt to this small space. Electric and air operated controls are frequently used and can be compacted in this limited area since they can utilize remote out-of-the-way drive means. However, where electric and air drive means are not practical, manual drive means, such as push-pull cables are used, and such manual systems are difficult to adapt to such limited space and at the same time be economically practical in their structure and efficiency in operation.

SUMMARY OF THE INVENTION

An object of the invention is to provide an improved manually operable air direction control means for climate control structure especially adapting to the limited area behind a vehicle dashboard and being economically practical and efficient in operation.

A more particular object is to provide a climate control structure of the type described using a rotatable driver and a pair of driven levers that operate push-pull cables, such structure contributing to the improvement in cost of manufacture and efficiency in operation.

Another object of the invention is to provide a climate control structure of the type described employing a novel panel mounted support of the rotatable driver and an outside-recirculate lever.

Yet another object is to provide a climate control structure that can be operated with minimum eye contact.

In carrying out these objectives, the air direction control means of the invention has a rotatable driver mounted on a dashboard panel. This driver has one or more projecting drive pins that are capable of driving pivoted levers connected to push-pull cables. The drive pins engage in slots in the levers for pivoting these driven levers. The rotatable driver is connected to a turning knob on the dashboard and has detent means corresponding in operation to printed climate designations associated with the knob. The levers have a drive end connection to the push-pull cables, and such connection can be selectively positioned to vary the throw of the levers. One of the levers has a cam edge capable of actuating an electric switch in the air conditioning system at selected positions of the lever.

The invention will be better understood and additional objects and advantages will become apparent from the following description taken in connection with the accompanying drawings.

BRIEF DESCRIPTION OF THE DRAWINGS

FIG. 3 is an exploded perspective view of the panel as viewed from the front.

FIG. 3A is an elevational view of a shaft portion for an outside air and recirculate lever.

DETAILED DESCRIPTION OF A PREFERRED EMBODIMENT

Figure 1:
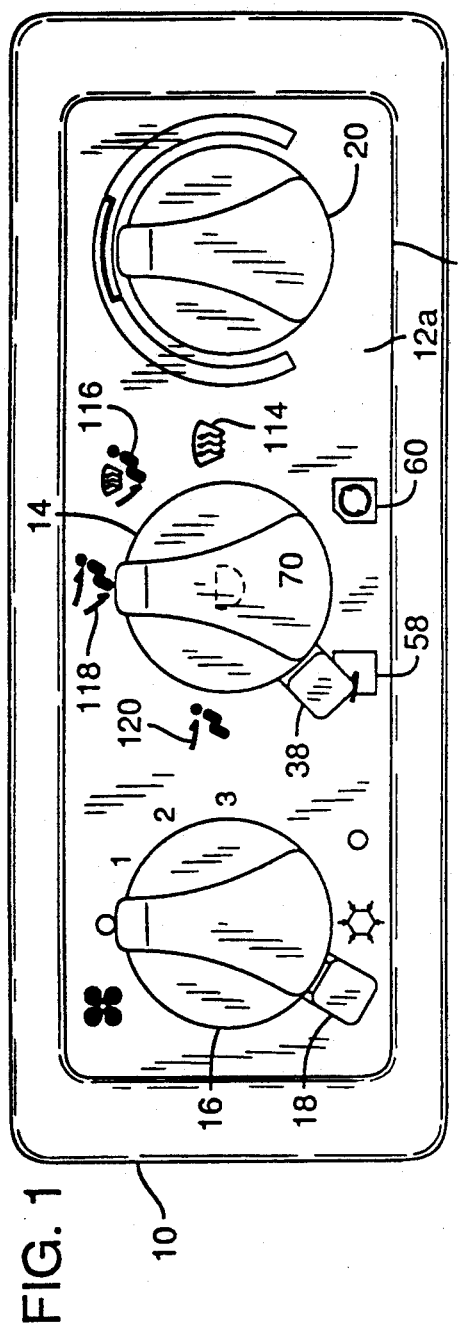
FIG. 1 is a face view of a mounting panel that supports the present air direction control means in a vehicle dashboard.

With particular reference to the drawings, the numeral 20 in FIG. 1 designates a dashboard of a vehicle in phantom lines, and the numeral 12 designates a climate control panel arranged to be removably supported in the dashboard. This control panel has a front wall portion 12a, also seen in FIG. 3, and a rear wall portion 12b, FIGS., 2, 3 and 4, suitably secured together in spaced relation to form a hollow interior. The center control 14, comprising a rotatable hand knob, controls air flow to the driver's compartment by novel drive means of the invention, as will be described more fully hereinafter. Other control means are mounted on the panel 12, comprising fan control means 16 combined with an on-off lever 18 for air conditioning, and temperature control means 20. The controls 16, 18, and 20 are conventional.

The panel 12 has removable mounted support in the dashboard by suitable fastener receiving tabs 22 and has an aperture 24 centrally through its front wall portion 12a, FIG. 3, in which a short hollow shaft 26 is journaled. This shaft has an outwardly directed flange 28 that abuts rotatably against the rear side of the front wall portion 12a. A portion of the shaft 26 projects beyond the front surface of the wall portion 12a and has end notches 30 for engagement with radial lugs 34 on an annular body portion 36 that encircles the shaft 26 and that has a lever handle 38 thereon. The annular body portion 36 and the flange 28 on the shaft 26 confine the shaft rotatably in the aperture 24. The shaft 26 retains the lever handle 38 by means of a series of retention lugs 31 which bear against a flange 37 in the annular body portion. The lugs 31 are suitably shaped to allow for ease in assembly and yet make unintentional disassembly difficult.

Projecting radially outwardly from the flange 28 is a lever arm 40 that pivotally receives a drive pin 42 on an arm 44. Arm 44 extends toward one end in the hollow area between the front and rear wall portions 12a and 12b and has an end guide finger 46 that rides in a slot 48, FIG. 2, molded in the rear wall portion 12b. This finger has connection to a push-pull cable 50 leading to door means, not shown in the air direction control means of the vehicle.

The inner or front surface of the rear wall 12b has a plurality of abutment posts 54 on which the inner end of shaft 26 rotatably rides. This end of the shaft has a pair of shallow rounded notches 56, FIG. 3A, selectively placed in it with relation to one of the posts 54 with a detent extension 54a such that the notches and the one post form detents to position the lever 38 and thus the drive means 44 in two positions. The shaft 26 in its mounted engagement between the two panel wall portions 12a and 12b is engineered to be of slight excessive length for this space, thus distorting the front wall portion 12a slightly such that the front wall portion 12a acts as a spring to force the shaft 26 against the posts 54. This force on the shaft causes effective operation of the detents but nevertheless allows the lever to be rotated to its two positions comprising a first position 58, FIG. 1, that moves the lever arm 40 to admit outside air or a second position 60 that moves the lever arm to the inside air. An arcuate wall segment 62 projects from the front surface of the wall portion 12a and forms a seat for the central control knob. This wall segment is of preselected arcuate length such that its end edges 64 form stops for the lever 38 in its two positions. These stops are selectively arranged to allow operation of the detent notches 56 but limit any movement past the detents.

Figure 4:
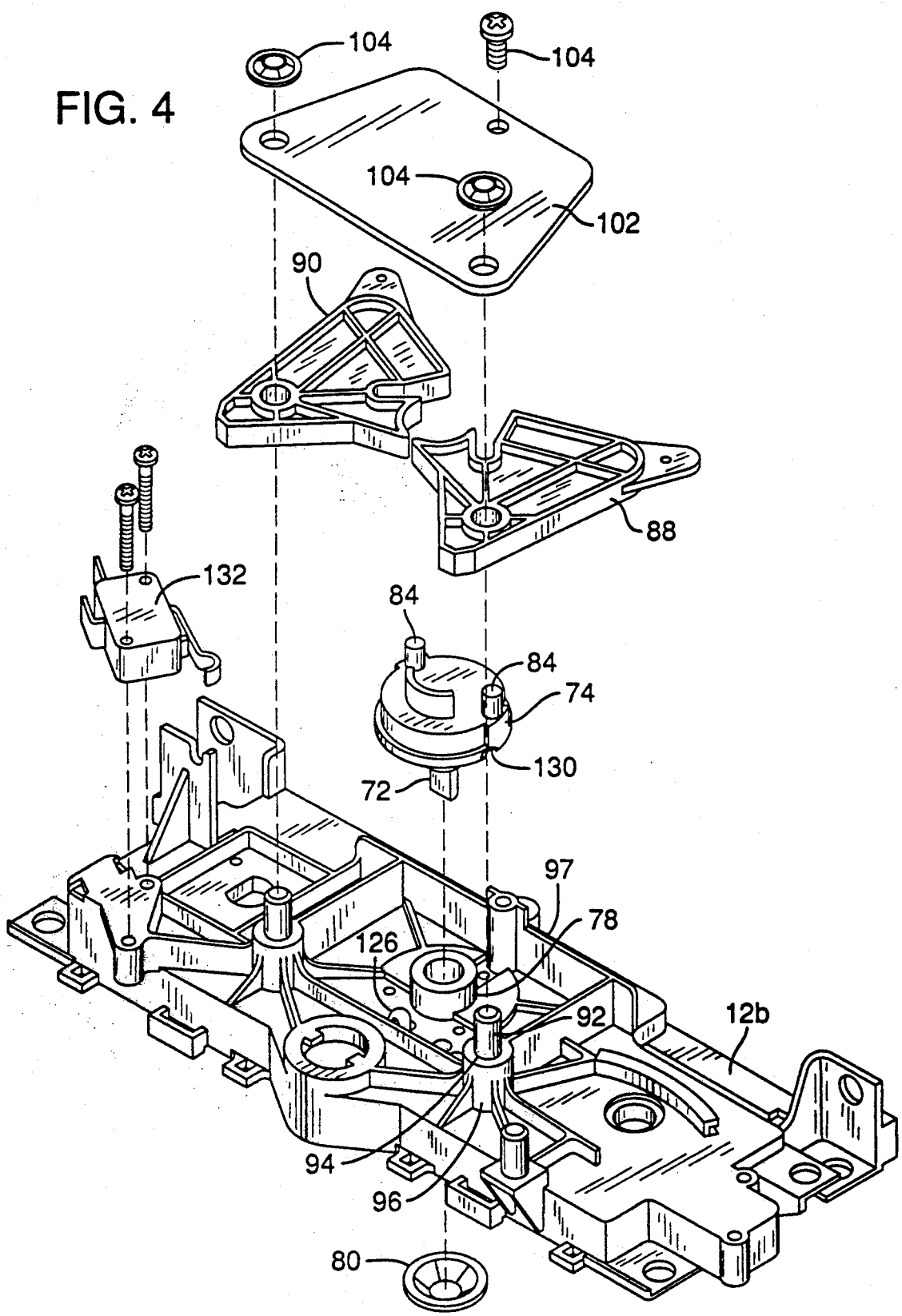
FIG. 4 is an exploded perspective view of the panel as viewed from the rear.

The center control knob 14 has a projecting stem 70, FIG. 3, on the rear side thereof that has a coupling with a forwardly extending shaft 72, also seen in FIG. 4, integral with a circular driver 74. Shaft 72 is journaled in a reinforced aperture 78 in the rear wall portion 12b of the panel. The shaft 72 projects forwardly of the wall portion 12b and receives a shaft retainer 80 that holds the driver rotatably connected to the rear wall portion.

Figure 2:
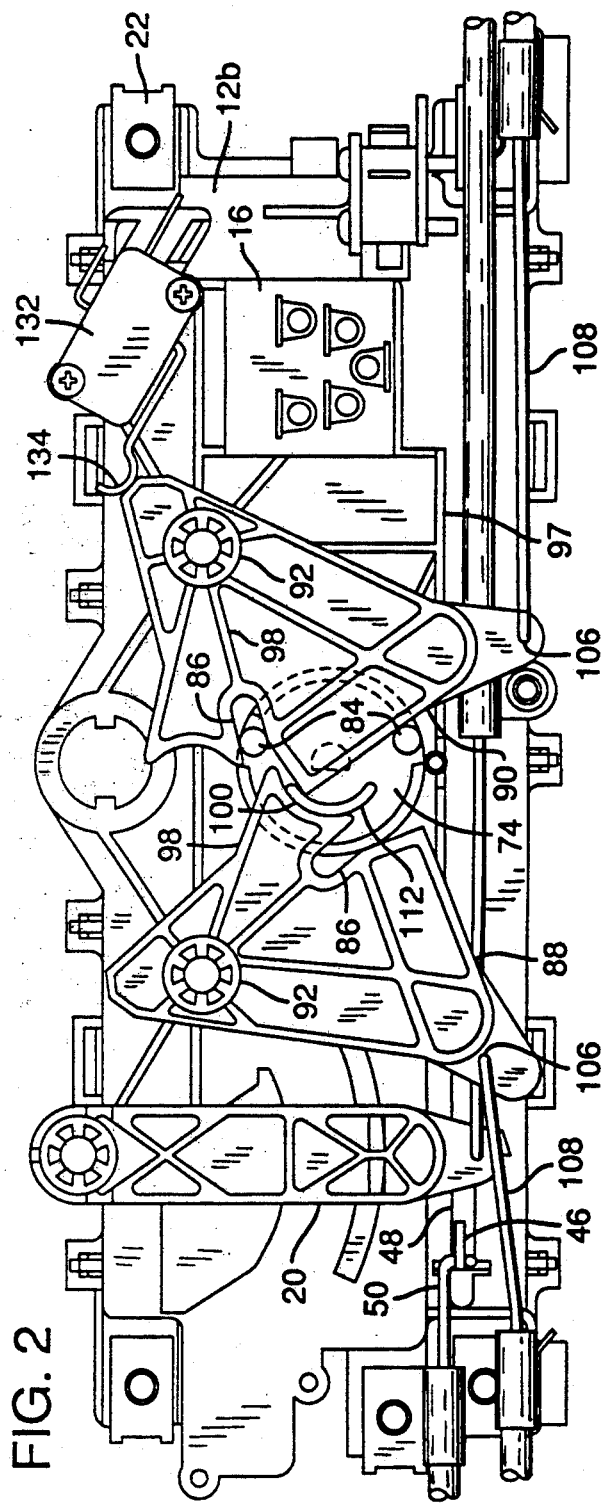
FIG. 2 is an enlarged rear elevational view of the control means, this view showing one control position of the driver and drive levers.

Driver 74 has a pair of rearwardly projecting drive pins 84, also seen in FIG. 2, that are located adjacent its peripheral edge. These drive pins engage slots 86 in a pair of respective driven links 88 and 90. Driven links 88 and 90 have relative laterally spaced pivot support 92 at one of their ends on shoulders 94 on a pair of posts 96 integral with the rear wall portion 12b of the panel. These links are supported for stable rotatable positioning on the shoulders and also on an extended rear wall frame portion 97. The links 88 and 90 also have opposed inwardly directed central arm portions 98 that terminate in short arcuate end surfaces 100. A rear cover plate 102 overlies the driven links and is secured to the posts as well as to an opposite point of the rear wall portion by suitable fasteners 104. Clamping engagement of the plate is such as to allow free rotation of the driven links while providing a guide for links 88 and 90 that prevents lateral deflection of these links.

The opposite ends of the driven links 88 and 90 from the pivot ends comprise drive connecting ends 106 for push-pull cables 108 that operate air flow doors in the air ducts of the vehicle, not shown. Slots 86 in the driven links 88 and 90 and the drive pins 84 are positioned such that the drive pins drive the links rotatably on their pivot posts upon rotation of the driver 74. The pins enter and leave the slots tangentially in their driving and exiting movements in a Geneva type wheel drive. The rear surface of the driver 74 has a short arcuate wall segment 112 arranged for engagement by the arcuate ends 100 of the driven links. The portions 100 and 112 have a similar radius of curvature for flush engagement. Wall segment 112 is of selected length and position such that when one link is being driven, the wall moves away from the driven link but stays in engagement with the other or non-driven link and serves to prevent any rotation of the latter. This wall segment thus serves as a stop for the link that is not being driven and thus it is apparent that only one of the links can move at a time.

The knob 14 has four positions, FIG. 1, comprising defrost 114, combined defrost and floor 116, combined floor and vent 118, and vent 120. The positions of the driven links for these four climate positions are shown in FIGS. 2, 7, 5 and 6, respectfully. Other intermediate positions may also be achieved, such as a floor only position.

Figure 5:
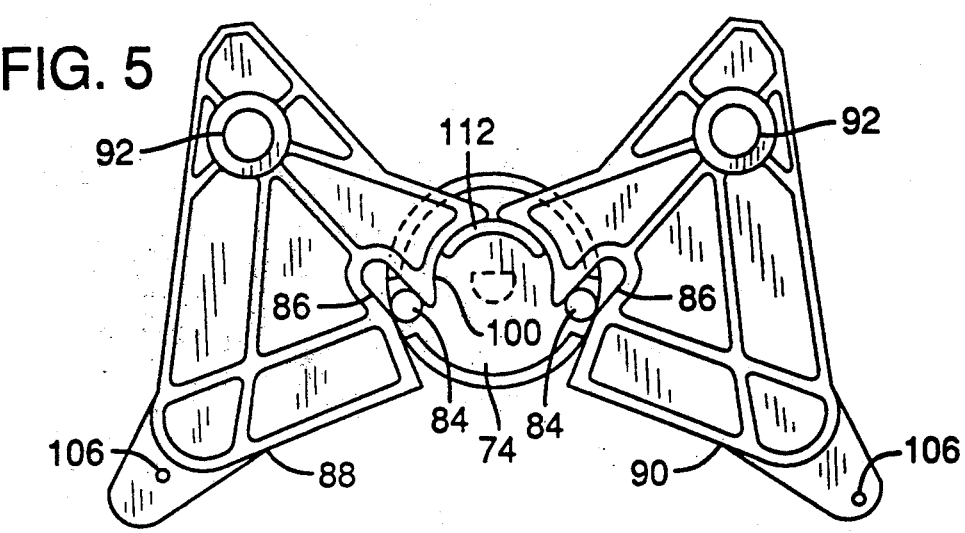
FIGS. 5, 6 and 7 are rear elevational views showing a series of climate control positions of the driver and drive levers in addition to the one shown in FIG. 2.

The operation of the driver 74 and the driven links 88, 90 is best illustrated first with the knob 14 in the vent-floor position, FIG. 5, wherein the two driven links are symmetrically positioned with each of the pins 84 engaged partly in their respective slots 86. Each of the curved surfaces 100 of the links is engaged by the arcuate wall segment 112. In this position, the drive ends 106 of the driven links have driven push-pull cables to position the air control doors such that the air is divided between the vent and floor.

Figure 6:
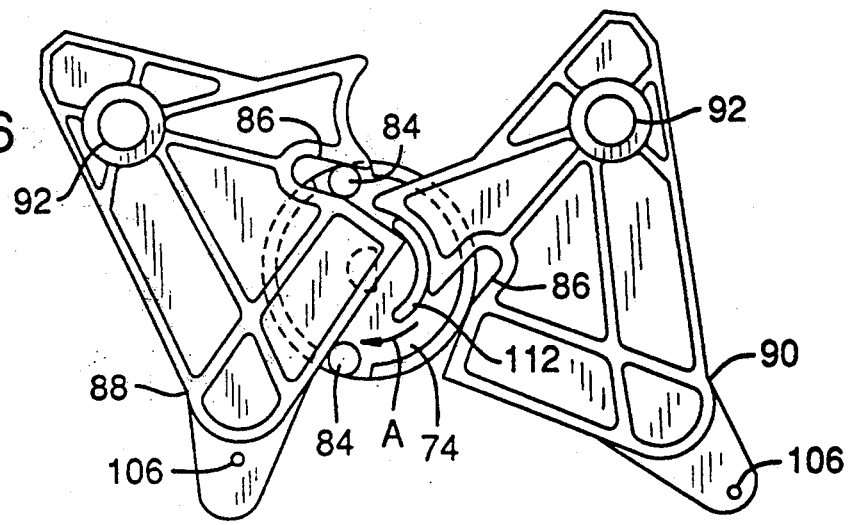

When moving the knob 14 and driver 74 to the left-hand position, namely, to the vent position 120, FIG. 6, in the direction of arrow A the pin 84 in driven link 88 rides in its slot 86 and drives this link rotatably. During this movement, the pin in the driven link 90 moves freely out of its slot without any driven engagement with link 90. This pin 84 also acts as a stop to prevent excess rotation of driver 74 when it abuts driven link 88. In such movement of the control knob the curved end 100 of the link 88 separates from the arcuate wall segment 112 to allow rotation of link 88 but the wall segment remains in contact with curved surface 100 of link 90 to anchor the latter against rotation whereby the drive ends 106 of the links operate the push-pull cable and the system supplies forced air to the vents only. When the knob 14 is turned back from vent 120 to vent-floor position 118, the pin 84 associated with the link 88 drives the latter back and the pin 84 associated with link 90 freely enters the slot of this latter link without driving it.

Figure 7:
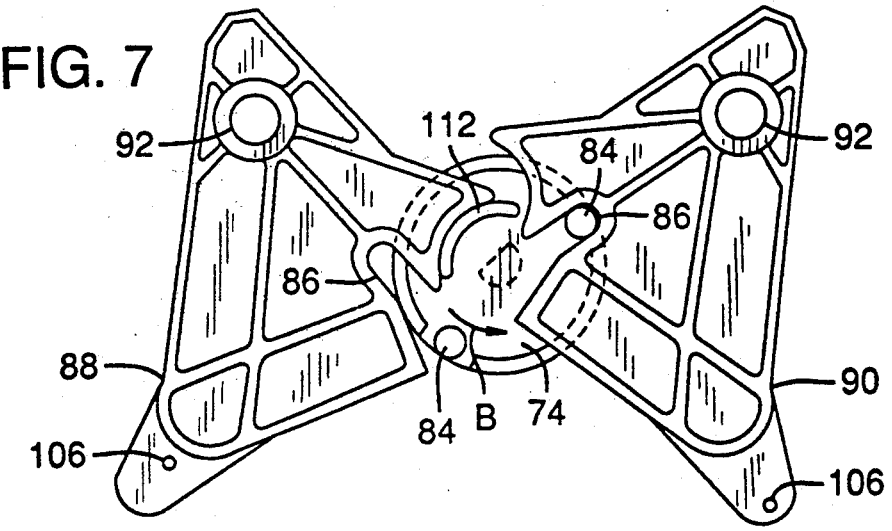

When the knob 14 is turned from the vent-floor position 118 to floor-defrost position 116, FIG. 7, in the direction of arrow B, pin 84 associated with link 90 drives it rotatably to such position and the other pin moves freely out of its slot. Link 88 is held in anchored position by the wall segment 112. In the further movement of the knob 14 to the defrost position 114, FIG. 2, the pin 84 associated with the link 90 drives the latter to the next rotated position to provide opening of the defrost door and closing of the door to the floor.

The driver 74 is associated with spring actuated detent means for its four positions. For this purpose, the rear wall portion 12b has a leaf spring 124, FIG. 3, with a detent end 126, projecting resiliently through an aperture 128 in the wall portion. This detent end is resiliently forced against the driver 74 which has recesses 130 that receive the detent end and that are selectively located to provide stops of the driver at the four positions of the knob 14. In addition to this detent positioning of the driver and knob, it is apparent from FIGS. 2 and 7 that limit stops of the links 88 and 90 are provided in the two end positions 114 and 120 of the knob by abutment of the pin 84 of the driving link with a side edge of the other driven link.

Driven link 90 is associated with a microswitch 132 that is mounted on the rear wall portion 12b adjacent the driven link 90 and that controls operation of the air conditioning unit of the vehicle. The arm of this switch is engaged by a cam edge 134 of this link in both positions 114 and 116 whereby the air conditioning unit is turned on in both positions involving defront. This switch overrides the off position of other control means for the air conditioning unit.

The air direction control means of the invention thus provides a manually operative system that can adapt to a very limited area behind the dashboard of a vehicle. The Geneva Wheel concept utilizing the driver that functions rotatably for operating the lever type driven links 88 and 90 contributes to the efficiency of the system and also to economy in manufacture and space requirements. This wheel drive has the advantage also that it provides indexing without impact loading. The location of the pins 84 may be selective as well as the specific place of connection of the push-pull cables to the drive ends 106 of the links 88 and 90 for adapting to various door positions and opening and closing functions thereof. The turning knob 14 is easily accessed by the driver on the dashboard and its detent positions are readily set without the driver looking down. As noted, other turning knobs 16 and 20 associated with the central knob 14 are similarly easily operated, as are the air conditioning lever 18 and outside-recirculating air lever 38.

It is to be understood that the form of my invention herein shown and described is to be taken as a preferred form thereof and that various changes in size, shape and arrangement of parts may be resorted to without departing from the spirit of my invention or the scope of the subjoined claims.

Having thus described my invention, I claim:

1. Air direction control means for vehicle climate control systems of the type having air ducts and doors for controlling the flow of air to an operator's compartment of the vehicle, said control means comprising:
   a mounting panel,
   a rotatable driver on said panel having a turning knob associated with climate designations depicted on said panel,
   two drive pins on said driver,
   two driven links pivotally supported in relative laterally spaced relation on said panel and capable of connection to operative means connected to doors in air ducts of a vehicle that control the flow of air in the air ducts,
   and slot means in each of said driven links engageable by respective drive pins providing driving pivotal movement of respective driven links upon rotation of said knob between said climate designations.

2. The air direction control means of claim 1 including a directional air flow rotatable lever having an axis of rotation in alignment with the axis of rotation of said rotatable driver and operative between said knob and said panel.

3. Air direction control means for vehicle climate control systems of the type having air ducts and doors for controlling the flow of air to an operator's compartment of the vehicle in conditions of air flow to dashboard vents, to a combined flow to the floor and defrost, and to defrost, said control means comprising:
   a mounting panel,
   a rotatable driver on said panel having a turning knob associated with climate designations depicted on said panel,
   at least two drive pins on said driver,
   at least two driven links pivotally supported on said panel,
   connecting means having opposite ends,
   one end of said connecting means being secured to said driven links and the opposite end being capable of securement to air duct doors of a vehicle that selectively control the flow of air in air ducts of a vehicle for flow to a dashboard vent of a vehicle, to floor and dashboard vent of a vehicle, to floor and defrost vents of a vehicle, and to a defrost vent of a vehicle,
   a slot means in each of said driven links engageable by respective ones of said drive pins providing selective driving pivotal movement of said diver links upon rotation of said turning knob between said climate designations.

4. The air direction control means of claim 3 including detent means associated with said driver for providing detent positioning of said driver at said climate designations on said panel.

5. The air direction control means of claim 3 including a directional air flow rotatable lever having an axis of rotation of said rotatable driver and operative between said knob and said panel.

6. The air direction control means of claim 3 wherein said driven links comprise levers having said pivot support adjacent one end, and connector means adjacent the other end of said levers for securement to operative means for air duct doors of the vehicle, said slot means being disposed in said levers intermediate the ends thereof.

7. The air direction control means of claim 6 including push-pull cable means serving as the operative means that connect said levers to air duct doors of the vehicle.

8. The air direction control means of claim 7 wherein said connector means on said levers allows selective connection of said push-pull cable means thereto to vary the throw of said levers.

9. The air direction control means of claim 3 including a wall segment on said rotatable driver selectively engageable by said driven links and serving as a stop such that upon driving movement of one of said driven links the other driven link is held stationary.

10. The air direction control means of claim 3 wherein one of said driven links includes a cam edge, and electric switch means on said panel actuated by said cam edge in the rotated positioning of said turning knob to each of the combined floor and defrost and the defrost positions.

11. The air direction control means of claim 3 wherein said mounting panel includes front and rear wall portions, support means on said rear wall portion for pivotal movement of said driver, shaft means on said driver projecting through said front wall portion for supporting said turning knob, and support means on said rear wall portion for pivotal movement of said driven links.

12. Air direction control means for vehicle climate control systems of the type having air ducts and doors for controlling the flow of air to an operator's compartment of the vehicle, said control means comprising:
   a mounting panel, a rotatable driver on said panel having a turning knob associated with climate designations depicted on said panel, at least one drive pin on said driver, at least one driven link pivotally supported on said panel and capable of connection to doors in air ducts of a vehicle that control the flow of air in the air ducts, slot means in each of said at least one driven link alternately engageable by said at least one drive pin providing driving pivotal movement of said at least one driven link upon rotation of said knob between said climate designations, and a directional air flow rotatable lever having an axis of rotation in alignment with the axis of rotation of said rotatable driver and operative between said knob and said panel.

* * * * *